Nov. 6, 1962 M. B. CARUS 3,062,734
ELECTROLYTIC CELL AND ELECTRODE THEREFOR
Original Filed Jan. 9, 1957 3 Sheets-Sheet 1
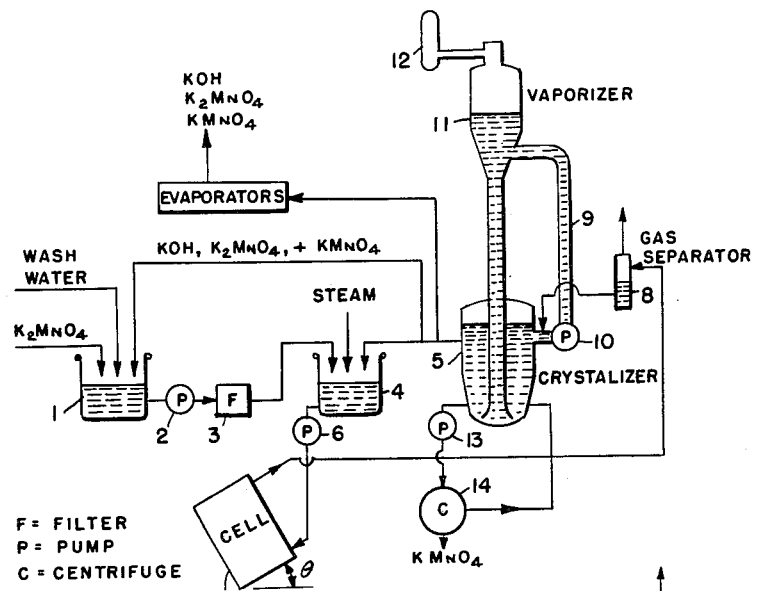
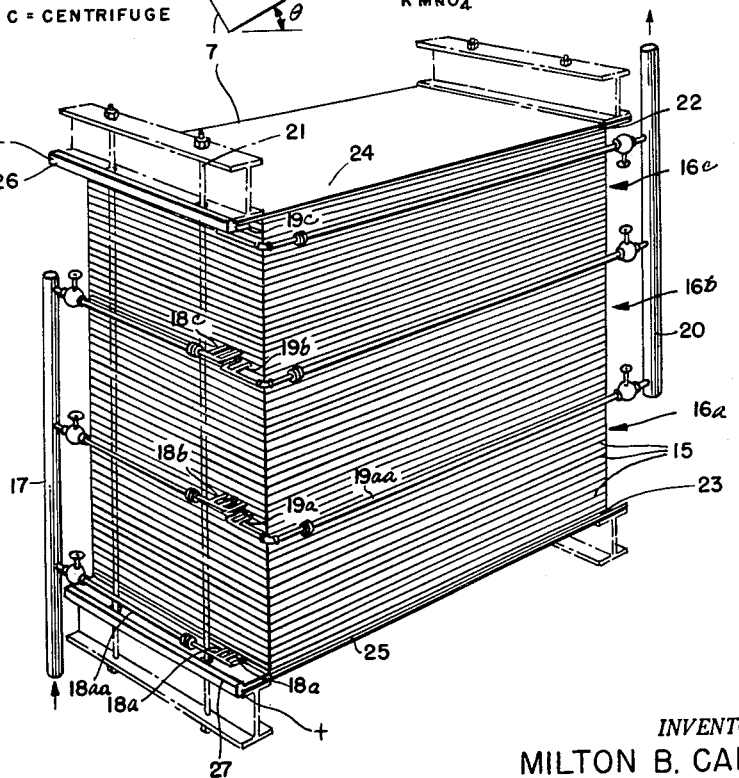
INVENTOR:
MILTON B. CARUS
BY Marshall, Johnston,
Cook & Root
ATT'YS Nov. 6, 1962 M. B. CARUS 3,062,734
ELECTROLYTIC CELL AND ELECTRODE THEREFOR
Original Filed Jan. 9, 1957 3 Sheets-Sheet 2

INVENTOR:
MILTON B. CARUS
BY Marshall, Johnston,
Cook & Root
ATT'YS

Nov. 6, 1962 M. B. CARUS 3,062,734
ELECTROLYTIC CELL AND ELECTRODE THEREFOR
Original Filed Jan. 9, 1957 3 Sheets-Sheet 3
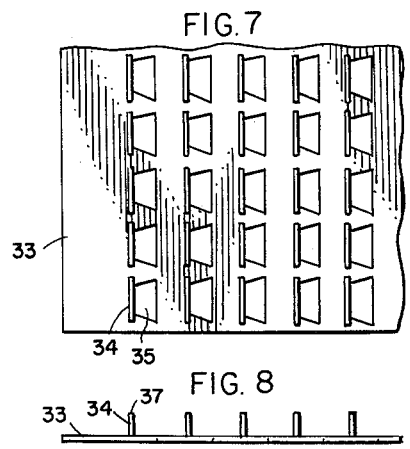
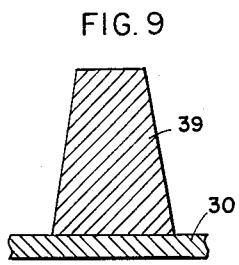
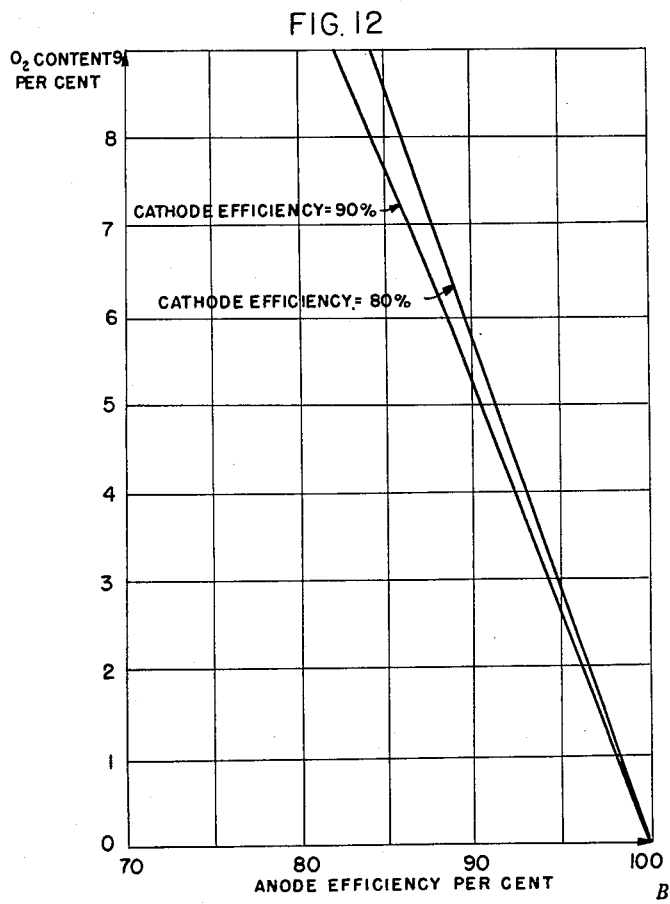
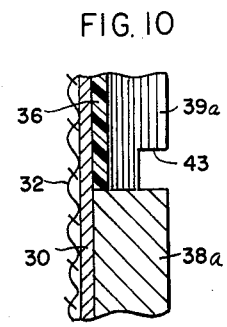
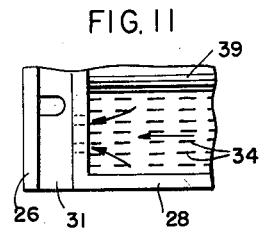
INVENTOR:
MILTON B. CARUS
BY
ATT'YS 3,062,734
ELECTROLYTIC CELL AND ELECTRODE
THEREFOR
Milton B. Carus, La Salle, Ill., assignor to Carus Chemical Company, La Salle, Ill., a corporation of Illinois
Original application Jan. 9, 1957, Ser. No. 633,212, now Patent No. 2,908,620, dated Oct. 13, 1959. Divided and this application Dec. 24, 1958, Ser. No. 782,697
6 Claims. (Cl. 204—270)

This invention relates to a new and improved electrolytic cell and to an electrode employed therein. The invention is more particularly concerned with a dipolar electrolytic cell and an electrode therefor.

This application is a division of my copending application Serial No. 633,212, filed January 9, 1957, now U.S. Patent 2,908,620, dated October 13, 1959.

The new apparatus of the invention is especially adapted for use in the production of potassium permanganate, but it is suitable for other applications as well. The apparatus advantageously assists in the provision of an improved and very efficient continuous type process for the production of potassium permanganate by electrolytic oxidation of potassium manganate, as described and claimed in my aforesaid patent application. The new apparatus claimed herein will be described with reference to the process of the prior application, to illustrate its operation and advantages.

The prior methods for producing potassium permanganate by electrolytic oxidation of potassium manganate include a batch type method in which potassium manganate solution is agitated or passed in gravity flow in parallel streams through banks of cells having separate cathodes and anodes. Another method involves passing potassium manganate solution in gravity flow in series through a number of adjacent dipolar cells. The potassium manganate feed solution is prepared by dissolving potassium manganate in aqueous potassium hydroxide, producing a concentrated solution containing on the order of 100–225 grams per liter of potassium manganate. This solution is charged to a cell and subjected to electrolysis until oxidized to the endpoint, or, in the case of oxidation in a number of cells in series, the solution is partly oxidized, potassium permanganate produced is crystallized, and electrolysis is continued, by a second pass through the cells. This process is repeated until oxidation is complete. Potassium permanganate is removed between passes to prevent crystallization in the cells.

The prior methods suffer in the low crystal purity of the potassium permanganate product, especially due to the presence of double salts of potassium permanganate and potassium manganate, requiring recrystallization operations and involved recovery procedures. Complications arise due to crystallization in the cells, cell and conversion efficiencies are often poor, and the power consumption is often high. The construction of the electrolytic cells and their operation necessitate sizable installations and considerable capital investment, space requirements, operating cost and labor.

The present invention has for its object to provide an improved electrolytic cell and electrode therefor which overcome the disadvantages previously encountered, are particularly well suited for producing potassium permanganate, and are also adapted for various other electrolytic processes.

A particular object is to provide an electrolytic cell and electrode which produce high current densities at one electrode surface and low current densities at the other electrode surface.

Another object is to provide an electrolytic cell which may be operated continuously to constantly and reliably produce a high quality product. High oxidation and electrolytic efficiencies are achieved.

A further object is to provide apparatus for conducting an electrolytic process in regulated electrolyte flow in a closed cell.

Another object is to provide an electrolytic cell which enables regulation of the electrolysis conditions according to the production of a gas in the cell, which is oxygen in the case of potassium manganate oxidation.

An additional object is to provide a cell which is readily constructed, assembled, and disassembled, and which provides long continuous trouble-free operation with very little maintenance.

Another object is to provide a very compact electrolytic cell requiring much less plant space than prior apparatus and which is well adapted for series and series-parallel electrolyte flow.

Another object is to provide apparatus which may be operated simply and with a minimum of personnel, and which is characterized by safe clean operation.

These and other objects, advantages and functions of the invention will be apparent on reference to the specification and to the accompanying drawings, in which like parts are identified by like reference characters in each of the views, and in which:

FIGURE 1 is a schematic illustration of a preferred overall process, showing a method of employing the new cell and the relationship of the preferred process carried out therein;

FIGURE 2 is a perspective view of a preferred cell or cell bank as employed in the invention;

FIGURE 7 is a further enlarged fragmentary plan view of a cathode element of the electrode, corresponding to a view taken on line 5—5 of FIGURE 4;

FIGURE 8 is a side elevation of the element of FIGURE 7;

FIGURE 9 is an enlarged cross-sectional view of a divider taken on line 9—9 of FIGURE 5;

FIGURE 10 is an enlarged cross-sectional view illustrating the construction of one of the dividers taken on line 10—10 of FIGURE 5;

FIGURE 11 is an enlarged fragmentary bottom plan view of a top or end electrode taken on line 11—11 of FIGURE 3; and FIGURE 12 is a graph of the anode efficiency versus the proportion of oxygen in the gases produced in the cell.

Figure 6:
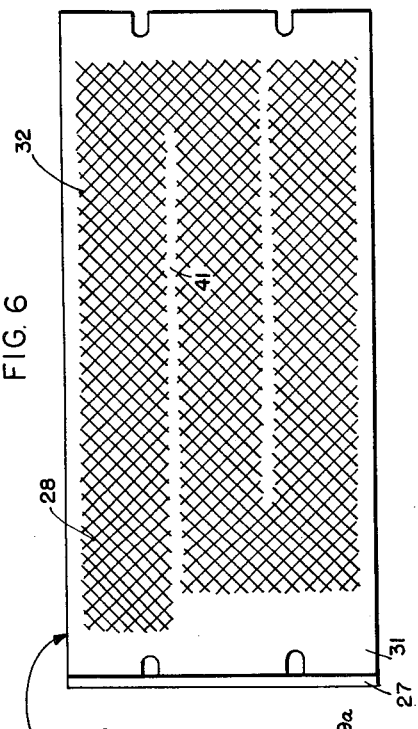
FIGURE 6 is an enlarged top plan view of a base or end electrode taken on line 6—6 of FIGURE 4.
Figure 4:
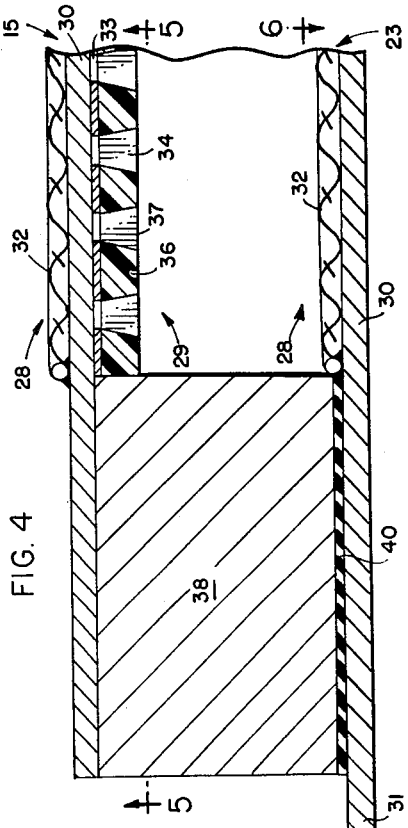
FIGURE 4 is a further enlarged fragmentary section illustrating the assembly and construction of the electrodes to form an individual cell of the cell bank.

The new apparatus concerned herein relates especially to FIGURES 2–12 of the drawings. FIGURE 1 illustrates the preferred use in the overall process claimed in my copending application Serial Number 633,211, filed January 9, 1957, now U.S. Patent 2,843,537, dated July 15, 1958. The new process thereof involves providing an aqueous potassium hydroxide solution of potassium manganate, mixing or diluting the solution with product solution, electrolytically oxidizing the resulting solution, and crystallizing the resulting solution to produce crystals of potassium permanganate and a mother liquor being the aforementioned product solution. The process may be carried out continuously in a most advantageous manner. Reference to potassium manganate herein means $K_2MnO_4$, wherein manganese has a valence of six.

The invention claimed in Serial No. 633,212 concerns particularly the new electrolytic oxidation process. Important features of the new process include oxidation in a closed cell, flow of the electrolyte cocurrently with the flow of gases produced, and regulation of the electrolysis conditions according to the production of oxygen in the cell. The feed solution preferably constitutes dilute potassium manganate solution.

The new cell construction claimed herein includes new electrodes and an advantageous combination and arrangement of the parts. The complete cell comprises a plurality of adjacent closed dipolar electrolytic cells adapted for applying a voltage thereto in series and for flow of an electrolyte therethrough in series, the dipolar cells having electrodes which comprise a conductive metal sheet forming an anode, conductive metal elements electrically connected to the sheet and projecting outwardly from spaced points distributed over a surface thereof, and insulating material filling the spaces between the elements with the outer extremities of the elements exposed, the exposed extremities forming a cathode.

Referring to FIGURE 1 of the drawings, the preferred process commences with the preparation of aqueous potassium hydroxide solution of potassium manganate in a leaching tank 1. Fresh potassium manganate is supplied to the process, and recovered and recycled potassium manganate is added thereto. The manganate is leached or dissolved in aqueous potassium hydroxide solution which constitutes mother liquors from the process, containing potassium hydroxide, potassium manganate and potassium permanganate. In dissolving the manganate, wash waters are utilized, including the permanganate wash water. The wash waters replace the water withdrawn from the cyclic process, reducing the potassium hydroxide concentration of the mother liquors to the desired degree for high cell efficiency.

The leach solution is pumped by a pump 2 from the tank 1 to a filter 3, for removal of insoluble materials. The filtrate passes to a second mixing tank 4, where it is diluted or blended with a further quantity of mother liquor produced in the process. In continuous operation, a storage tank, not shown, may be provided between the first and second mixing tanks, 1 and 4. The quantities of mother liquor supplied to the first and second mixing tanks 1 and 4 are withdrawn from a subsequent crystallizer 5, adjacent the top of the solution therein. The materials supplied to the second mixing tank 4 are heated with live steam, but other heating means can be employed. The solution is then removed and pumped by a pump 6 to an electrolytic cell 7. The solution from the second tank 4 constitutes the electrolyte in the cell, and it passes through the cell in regulated flow for oxidation of the potassium manganate to potassium permanganate according to the following equation:

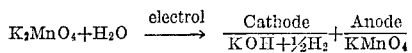

The oxidized solution from the cell 7 is conveyed to a gas separator 8, where the gases produced are vented from the solution and continuously analyzed for oxygen proportion. The solution is then conveyed to a riser 9 connected to the crystallizer 5, and it is pumped upwardly in the riser together with a large volume of liquor from the crystallizer by a pump 10. The contents of the riser discharge into a vaporizer 11, which is maintained under reduced pressure, or evacuated, by condenser and vacuum equipment represented at 12. Evaporation and consequent cooling of the solution takes place in the vaporizer.

The cooled solution in the vaporizer is supersaturated with potassium permanganate, and it descends into the crystallizer 5 at a point adjacent the bottom thereof. The supersaturation is released in the crystallizer, crystals of potassium permanganate forming on the nuclei or crystals present in the crystallizer. This results in a quantity of potassium permanganate crystals and a body of saturated mother liquor in the crystallizer.

Mother liquor is withdrawn from the upper portion of the crystallizer, as previously described, and potassium permanganate crystals are withdrawn in a slurry from the lower portion, by means of a pump 13. The potassium permanganate crystals are separated and washed with water in a centrifuge 14, after which they are dried by conventional means not shown. The mother liquor from the centrifuge is recycled to the crystallizer. A portion of the liquor in the crystallizer 5 is also withdrawn and conveyed to an evaporator for recovery of the potassium hydroxide produced in the electrolytic oxidation and removal of miscellaneous salts and impurities, by conventional methods.

Recovered and by-product materials are reused insofar as possible. Thus, the potassium permanganate wash water is employed in the preparation of the leaching solution in the first mixing tank 1. From the evaporation of liquor, potassium hydroxide is recovered which may be used in the production of potassium manganate. Potassium manganate and potassium permanganate are separated in the evaporation, and they may be supplied to the first mixing tank.

The operating units schematically illustrated in FIGURE 1 are conventional, with the exception of the cell 7 which is a preferred embodiment of this invention. The crystallizer 5 illustrated and employed in the exemplary process herein is a conventional 10 foot diameter suspension container having a capacity of about 7000 gallons. The pump 10 connected to the riser 9 from the crystallizer has a capacity of 3000 gallons per minute. The vaporizer 11 is a conventional vaporizer having a diameter of 8½ feet.

The new process is preferably and very advantageously carried out with the new electrolytic cell or cell bank 7 illustrated in FIGURES 2 through 11. FIGURE 2 illustrates a complete cell 7 composed of a bank or column of dipolar electrodes 15 in side-by-side relationship and secured together to form a plurality of individual closed cells. Any two adjacent electrodes form one cell, as will appear. The cell bank 7 in the embodiment illustrated is also divided into three cell sections 16a, 16b, and 16c. The feed solution is supplied to the cell bank 7 in series-parallel, that is, feed solution passes through cells in each cell section in series, and the three cell sections are fed in parallel. In the particular embodiment illustrated, it is found that division of the cell bank 7 into three sections of twenty individual cells each is preferable due to the resistance to flow, which becomes substantial with more than twenty cells in series.

The feed solution is thus supplied through a main pipe or conduit 17 to three groups of parallel section feed conduits 18a, 18b, and 18c, which enter the first cell of each of the sections of twenty cells. The oxidized solution exits from the twentieth or last cell of each section through parallel groups of conduits 19a, 19b, and 19c, from whence they are conveyed to the gas separator 8 by a discharge conduit 20. Between each feed and outlet conduit and its respective manifold is a 4 foot section of glass pipe, e.g., 18aa or 19aa, for electrical insulation purposes.

The electrodes 15 are clamped together in gas-tight union by tie rods 21 or the like. The end, or top and bottom, electrodes 22 and 23 are insulated by insulating sheets 24 and 25, preferably constructed of ebony asbestos. Bus bars 26 and 27 are electrically connected to the respective end electrodes 22 and 23, adjacent one extremity thereof, and the bus bars are connected to a source of D.C. power, preferably about 140–170 volts, depending upon the current desired. The individual cells and the electrodes 15 thus have a voltage applied to them in series, so that the potential across each of the sixty cells is one-sixtieth of the total voltage. In this connection, it will be apparent that the cell dimensions and the corresponding applied voltage and total current are determined from practical considerations and according to the power available. The electrolytic oxidation process performed in the cell is fundamentally only a function of the current density at the electrodes.

FIGURES 4–8 illustrate in detail the construction of the electrodes 15 and their assembly. The electrodes are dipolar, and each constitutes both an anode 28 and a cathode 29, except for the top and bottom electrodes 22 and 23 which necessarily perform only a single function. Two adjacent electrodes form a cell together, of the anode of one and the cathode of the other. The electrolyte of the solution to be oxidized and being oxidized flows between the anode and cathode of adjacent electrodes.

In the oxidation, it is necessary that the current density at the cathode 29 be much higher than that at the anode 28. The current density must be high at the cathode to avoid reduction of potassium permanganate there. The current density must be low at the anode, so that the anode efficiency is high, with good oxidation of potassium manganate to potassium permanganate and low oxygen production. Previously, the anode consisted a bare metal sheet, and the cathode was a smaller bare metal sheet, or was covered by a perforated insulating material such as transite to decrease the effective area of the cathode and increase the current density. Also, diaphragms had been provided between the electrodes. However, such perforate materials were unsatisfactory, as the openings therein rapidly became plugged with solids. The electrode 15 illustrated functions very well to provide the necessary current density, and interference by solid deposits is greatly reduced. The surface of the cathode 29 is constructed to preclude such fouling. The anode need be flushed only after periods of one to six weeks to remove solids therefrom.

The electrode 15 is constructed of materials which are resistant to the alkaline manganate solutions at the temperatures employed under electrolysis conditions. Thus, a base sheet 30 of 11-gauge hot-rolled steel may be employed. The base sheet of each of the top and bottom electrodes 22 and 23 extends outwardly from the cell at the ends to provide a flange portion 31 on each for mounting the bus bars 26 and 27.

The anode surface 28 of the electrode is provided with one or more preferably monel metal wire screens 32, which are electrically connected to each other and to the base sheet 30 by spot welding or the like at the edges and at a number of points over the surface of the anode.

At the cathode surface 29 of the electrode, a sheet of 22-gauge cold-rolled steel 33 is electrically connected to the base sheet 30, as by welding. The 22-gauge sheet 33 is stamped or blanked out to provide partly severed and integral or connected perpendicularly outwardly projecting conductive metal elements 34, as illustrated in FIGURES 4, 5, 7 and 8, leaving corresponding perforations or openings 35 in the sheet. The spaces between the conductive elements 34 at the cathode surface are filled with an insulating or non-conductive material 36, which may be a synthetic organic resin or other material having the requisite resistance to the conditions of electrolysis. Polystyrene is preferably and very satisfactorily employed. Another thermoplastic resin contemplated for use is tetrafluoroethylene polymer.

In the construction of the electrode, the anode screens 32 and the cathode sheet 33 are connected to the base sheet 30, and the spaces between the conductive elements 34 are filled with polystyrene molding powder, which is heated and plasticized to completely fill and seal the spaces. Then, the polystyrene is milled off and seal the spaces. Then, the polystyrene is milled off to expose the steel tips or extremities 37 of the conductive elements, presenting the appearance illustrated in FIGURE 5.

In this manner, a small cathode area is exposed, consisting of the extremities of the conductive elements uniformly distributed at spaced points throughout the surface of the cathode 29. In the illustrative embodiment, 4% of the cathode surface is metal corresponding to the exposed edges of the elements, and the remainder is polystyrene. The reverse side of the electrode 15, constituting the anode, preferably has a considerably increased conductive area, by virtue of the screens 32 and the substantial additional surface afforded thereby. One or more, and preferably two screens 32 are employed, and more may be used if desired. The screens perform an additional beneficial function in producing turbulence or agitation in the electrolyte flowing through the cell, very favorably affecting the efficiency of conversion at the anode.

Figure 5:
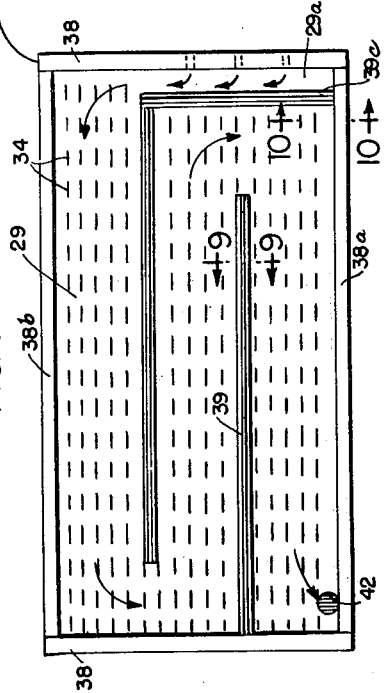
FIGURE 5 is an enlarged bottom plan view of an electrode taken on line 5—5 of FIGURE 4.

FIGURES 5 and 6 illustrate the assembly of one individual cell, illustrated as the lowermost or first cell in the cell bank 7. In assembly of the cell, the electrode as illustrated in FIGURE 5 may be visualized as rotated over onto the surface of the electrode of FIGURE 6, in the manner of closing a book. In the construction of the cells, bordering spacers and sealing or closure members 38 are provided around the edges of the electrodes, and flow dividers 39 are emplaced on the surfaces of the electrodes. In assembling the cell, the spacers and dividers of insulating material are assembled together with the cathode surface 29, and sealed and adhered thereto by plastic junctions, for example, by applying polystyrene in a solvent such as toluene at the junctions, and evaporating the solvent. Prior to assembly, a coating of heavy tarry material 40 is provided on the exposed edges of the border pieces 38 and the dividers 39, for effecting a tight seal when the plates are stacked and bolted or clamped together. It will be observed in FIGURE 6 that the screens 32 are located on the surface of the base sheet 30 by means of a template or the like, to leave uncovered or exposed areas 41 on the surface of the base sheet which correspond to the locations of the border pieces 38 and the dividers 39, for assembling the cell with the pieces therein.

Figure 3:
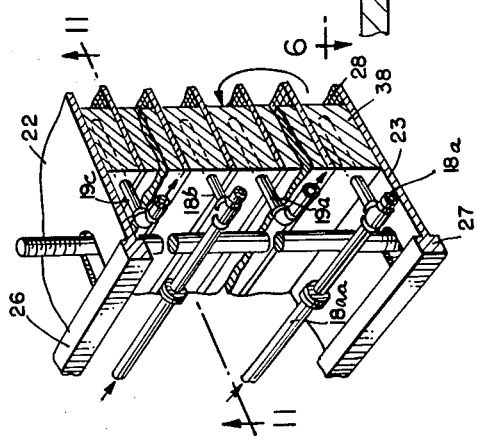
FIGURE 3 is an enlarged fragmentary perspective and sectional view of the cell.

FIGURE 3 illustrates the manner in which the feed conduits 18a–c and the discharge conduits 19a–c are connected to the cells. They pass through the end border pieces 38 and communicate with the interior of the cells. The feed and discharge conduits are non-conductive material, preferably tetrafluoroethylene polymer. FIGURE 9 illustrates the slightly tapered construction of the dividers 39, which is for the purpose of giving more tolerance to the fabricated screens 32 in assembling the cell.

The more specific description herein and in the example refers particularly to a cell 7 which is constructed with electrodes 15 having ends 48 inches wide and sides 96 inches long, including the bordering spacers 38 and excluding the extensions 31. This area is decreased by the spacers 38, which are 2 inches wide, and they are 1¼ inches in depth. The dividers 39 have a width of 1 inch at the base and ½ inch at the top, and they are 1¼ inches deep. The distance between the cathode of one electrode 15 and the anode of the adjacent electrode is ⅞ inch, surface to surface, providing a liquid stream of approximately the same thickness or depth. Two superimposed anode wire screens 32 are provided, 8 mesh (U.S. sieve series) and .047 gauge Monel metal. The cathode element extremities 37 are ¼ inch long, and the elements 34 extend 5/16 inch from the surface of the cathode sheet 33. About 5000 cathode elements are provided. The conductive cathode area is 930 square centimeters, and that of the anode is 140,000 square centimeters (ratio of 1:150).

The cells are preferably operated with the anodes 28 below the cathodes 29, but in principle, their positions could be reversed. The flow of solution to be oxidized or electrolyte is illustrated with reference to the dividers in FIGURE 5. FIGURES 5 and 11, respectively, illustrate the feed to and discharge from the cell bank 7. The liquid enters through the feed conduits 18a–c above the first electrode 15 in each cell section 16a–c, in the channel defined by the end divider 39a and the end border piece 38. The channel is insulated by a strip 29a of ebony asbestos on the surface of the cathode 29. The liquid passes through the cell in tortuous flow around the dividers and exits through an opening 42 in the opposite end of the electrode from the feed end. The liquid passes through the opening into the next adjacent cell, which is above the preceding cell in the series flow, in the embodiment illustrated. The arrangement of the dividers 39, and the corresponding liquid flow, in the next adjacent cell is a mirror image of the arrangement illustrated, so that the opening 42 communicates with a duplicate channel to that illustrated as formed by the end divider 39a and the border piece 38, which is at the opposite end in the next cell. Liquid flow in the next cell then proceeds in the opposite direction to discharge through another opening like the opening 42 in the first cell, at the opposite end of the next electrode. The liquid flow proceeds back and forth in series from one cell to the next until the liquid passes through the last or twentieth cell in each cell section. The liquid then exits at the same end of the cell bank 7 as the feed end, through the discharge conduits 19a–c, which project into the end of the cell in the area corresponding to the discharge opening 42 which is present in the preceding cells (see FIGURE 11).

The cell design and the flow pattern are established to provide cocurrent flow of liquid and gases, so that the cell is operated in forced circulation without gas binding. The gases discharge evenly and continuously together with the oxidized solution through the discharge conduit 20, and the mixture is conducted to the gas separator 8. The gases are vented off and analyzed continuously for oxygen content, on the basis of of which the operation is regulated, as subsequently described. To achieve this cocurrent flow, the base of the cell as represented is at angle θ with the horizontal, illustrated as about 30° in FIGURE 1. This view is a representation of the narrow side or end of the cell. Thus, the spacer 38a of each electrode adjacent the discharge opening 42 is at the upper edge, and the opposite spacer 38b is at the lower edge. Liquid flow in each cell is from the area adjacent the lower edge to the area adjacent the upper edge with the gas ascending therewith. Because the feed to each cell enters at the high edge 38a, a by-pass opening 43 is provided in the end divider 39a at its upper end (see FIGURE 10). The opening bypasses or vents the gas not conducted by the liquid from that area. In providing the cocurrent flow, the cell can also be arranged with the electrodes extending at different angles or vertically.

While the apparatus and arrangement of parts illustrated are preferred, it will be apparent that variations may be made within the scope of the invention.

In carrying out the preferred process, the potassium hydroxide concentration in the first mixing tank or leacher 1 should be strong enough to prevent substantial potassium manganate hydrolysis. It should not be too strong, because later in the process, cell efficiency and crystal purity are impaired. It is preferred that the potassium hydroxide concentration be about 70 to 150 grams per liter, preferably 80 to 120 grams per liter.

The potassium manganate concentration should not be too high, as otherwise hydrolysis increases, with the production of permanganate and manganese dioxide. With low manganate concentrations, excessive amounts of liquid must be handled. It is preferred that the potassium manganate concentration be about 100 to 200 grams per liter, and 120 to 180 grams per liter is further preferred.

It is also preferred to provide as much potassium permanganate as possible in the leach liquid, to prevent hydrolysis of the concentrated manganate. Thus, a solution containing about 100 grams per liter of potassium hydroxide and about 150 grams per liter of potassium manganate is preferably saturated with potassium permanganate, representing about 50 grams per liter thereof.

The leach solution is made up at about 50° C. to 60° C., is filtered, and is then charged to the second mixing tank 4. There, the leach solution is diluted with several volumes of mother liquor from the crystallizer 5, the proportions depending upon the quantities of materials present in the two liquids. The mixture is heated, such as with live steam, as necessary to provide a temperature of preferably about 55° C. to 75° C.

The solution thus prepared for electrolytic oxidation preferably contains potassium hydroxide in a concentration of 80 to 180, preferably 120 to 150, grams per liter. The potassium manganate concentration is preferably about 35 to 80 grams per liter and further preferably, 50 to 60 grams per liter. The potassium permanganate is preferably below about 35 grams per liter. The proportions of manganate and permanganate are selected so that under the operating conditions, the quantity of potassium permanganate produced in the cell 7 is within and does not exceed its solubility in the solution or electrolyte after oxidation. There is then no problem of crystallization in the cell.

The solution is oxidized at a temperature of about 55° C. to 80° C. The initial solution enters the cell at a preferred temperature of about 55° C. to 75° C., and the temperature increases in the cell about 3°–5° C. Higher temperatures are avoided in this process, because the cell efficiency decreases.

The process is operated to produce an oxidized solution preferably containing about 30 to 70 grams per liter of potassium permanganate, further preferably 45 to 55 grams per liter. The resulting potassium manganate concentration is preferably about 15 to 50 grams per liter, further preferably, 20 to 30, grams per liter, 15 to 20 grams being substantially the end point of electrolytic oxidation. It is preferable to avoid increasing the amount of potassium manganate remaining, to avoid an adverse effect on the purity of the product crystals and to minimize the second salts to be handled. By the endpoint is meant the potassium manganate concentration at which the rate of oxidation of the manganate decreases rapidly. The potassium hydroxide concentration increases in proportion to the permanganate production, with one mole of potassium hydroxide being produced for each mole of permanganate produced. The proportions of the materials after oxidation are, consistently with the initial proportions such that the potassium permanganate is within its solubility in the solution.

In this connection the production of a solution of greater potassium permanganate concentration tends to reduce the anode efficiency. The production of potassium permanganate is further regulated by the quantity present in the starting solution, described above. Also, it is preferable to provide at least about 5° C. of superheat in the electrolyte, to prevent possible crystallization of permanganate in the cell due to local supersaturation.

The feed solution is supplied to the cell 7 described at a rate of about 40 to 75 gallons per minute, preferably 45 to 65 gallons per minute. The flow is sufficient to create turbulence around the anode 28, preferably about 4 to 6 inches per second over the anode. The flow rate is also correlated with the oxidation rate, as determined by the current suplied, and the temperature of the solution, which determines its capacity for permanganate. Thus, for example, at a current of 1200 amperes and corresponding production of 12 pounds of permanganate per minute, with the solution at 62° C., a flow rate of about 60 g.p.m. is selected.

The cathode current density is preferably from 50 to 400 times the anode current density, further preferably, 100 to 200:1. To provide such current density ratios, the conductive surface areas of the cathode and anode bear an inverse ratio to each other, i.e., 1:50 to 400. The cathode current density for the embodiment illustrated is preferably 0.4 to 2.0 amperes per square centimeter, further preferably, 0.6–1.5 amperes per square centimeter. The anode current density is preferably 0.003 to 0.014 ampere per square centimeter, further preferably, 0.005 to 0.009 ampere per square centimeter. The exposed cathode surface represented by the extremities 37 of the conductive element 34, and the exposed anode surface represented by the screens 32 and the adjacent surface of the base sheet 30 are determined to provide the proper current densities. The voltage across each cell is determined by the current density and the cell resistance. In the illustrated embodiment, the resistance is low, and the individual cell voltage is in the range of about 2.3 to 2.8 volts.

After the start of operation, the operating conditions for the cell or electrolysis conditions are regulated basically in the preferred process according to the production of oxygen in the cell, which is determined by analysis of the effluent gases. To operate in this manner, it is first necessary to determine the cathode efficiency under given conditions of current density and operating temperature. This is determined in a known manner by determination of the production of hydrogen and comparison with the theoretical production. At the same time, the optimum cathode current density is determined.

At a given current density and operating temperature, the cathode efficiency remains relatively constant when the feed conditions, that is, the solution flow rate or the composition of the solution, are varied. At a given cathode efficiency, the oxygen proportion in the effluent gases ($H_2$ and $O_2$) corresponding to various anode efficiencies is calculated. A curve is plotted of the anode efficiency versus the oxygen content for the cathode efficiency at which the cell will be operated, as illustrated in FIGURE 12 of the drawings.

In operation, the oxygen proportion in the discharged gases is measured, from which the anode efficiency is determined according to the graph. The process operates at an anode efficiency in the vicinity of 90–92%. The efficiency will decrease when the flow of electrolyte is too low, the concentration of manganate in the feed is too low, or deposits accumulate on the anode. Accordingly, if the oxygen content indicates a substantially lower efficiency, indicating greater electrolysis of water, the rate of feed is increased to supply more manganate for oxidation and return to the expected anode efficiency. The same result is accomplished, alternatively, by increasing the concentration of manganate in the feed.

In another alternative, the current density can be reduced by reducing the voltage, to regain the expected anode efficiency. When the change is not great, the change in cathode efficiency may be disregarded, especially at a high cathode efficiency. Otherwise, a different curve on the graph is used, to correspond to the resulting different cathode efficiency. Thus, the operation of the cell is controlled simply and reliably according to the production of oxygen in the cell. When deposits on the anode increase to the point that the operation loses efficiency, the cells are cleaned.

The oxidation product solution is conducted from the gas separator 8 to the riser 9 connected to the crystallizer 5, as previously described. The pump 10 circulates the mother liquor and the fresh product solution at a rate of 3000 gallons per minute, the vaporizer is at an absolute pressure of about 35 mm. Hg, and the temperature in the vaporizer 11 and in the crystallizer 5 is about 38° C. in the illustrative process. However, these conditions can be varied. Thus, a greater vacuum may be employed with consequent increased evaporation and cooling in the vaporizer. An increased quantity of potassium permanganate then crystallizes in the crystallizer, and the mother liquors contain a lesser concentration of potassium permanganate.

Mother liquors are circulated to the mixing tanks 1 and 4, as described, the proportions being adjusted to provide the compositions previously described. A quantity of liquid is also removed from the crystallizer for removing the potassium hydroxide formed in the process and for removal of impurities. The crystallized potassium permanganate product is pumped from the bottom of the crystallizer by the pump 13 in about a 30% solids slurry. The further processing is as previously described.

The following example illustrates operation of the preferred process employing the apparatus according to the invention, but it is to be understood that the invention is not limited to the particular equipment and mode of operation given therein.

*Example*

A leach solution is prepared in the first mixing tank 1 from fresh potassium manganate of about 82–90% purity. and from recovered salts, mother liquor from the crystallizer, and wash waters. The solution is prepared at 50° C. to 60° C. and has the following composition:

| | Grams per liter |
|---|---|
| KOH | 100 |
| $K_2MnO_4$ | 150 |
| $KMnO_4$ | 50 |

14 gallons per minute of the solution is filtered through the filter 3 to remove impurities and insoluble materials, and is then conducted to the second mixing tank 4.

In the second mixing tank, the leach solution is continuously mixed in the proportion of one part by volume to about three parts by volume of mother liquor from the crystallizer 5, the mother liquor being at 38° C and having the following composition:

| | Grams per liter |
|---|---|
| KOH | 135 |
| $K_2MnO_4$ | 25 |
| $KMnO_4$ | 25 |

Live steam is introduced into the second tank until the temperature is 65° C. The resulting solution for oxidation has the following composition:

| | Grams per liter |
|---|---|
| KOH | 120 |
| $K_2MnO_4$ | 53 |
| $KMnO_4$ | 30 |

The solution is continuously pumped from the second tank 4 by the pump 6 to the cell 7 at a rate of 50 gallons per minute, in three parallel streams through the three cell sections 16a–c. D.C. power is connected to the cell, 155 volts and 1150 amperes. The resulting cathode current density is 1.3 amperes per square centimeter, and the resulting anode current density is .009 ampere per square centimeter. The temperature of the effluent from the cell is 68–70° C.

The oxidized solution flows to the gas separator 8, where the gases are vented. The gases are continuously analyzed for oxygen by a Beckman oxygen analyzer, and the percentage of oxygen in the gases is recorded continuously. The cell should operate at an anode efficiency of about 90–92% and a cathode efficiency of about 89%, corresponding to an average oxygen production of about 4–5%, as illustrated in FIGURE 12. If the oxygen content increases to about 6%, the leach solution flow is increased to about 16 g.p.m., and it then usually comes down again. If it does not but keeps on climbing, the cell must be shut down and flushed out, after which its operation is again brought back to normal. When the leach solution flow rate is increased in the foregoing manner, the quantity of mother liquor mixed therewith in the second tank 4 is kept constant, as is the flow rate to the cell 7. This results in an increased manganate concentration in the feed solution to the cell.

Operating in this manner, the product from the cell has the following average composition:

| | Grams per liter |
|---|---|
| KOH | 128 |
| $K_2MnO_4$ | 24 |
| $KMnO_4$ | 53 |

The warm product solution is mixed with the crystallizer solution, which is at 38° C., and is pumped therewith up the riser 9 at the rate of 3000 gallons per minute. The absolute pressure in the vaporizer is about 35 mm. Hg, and about 3.5 gallons per minute of water are vaporized, cooling the solution in the riser from about 38.5° C. to 37.8° C.

Crystallization takes place in the crystallizer, to leave a mother liquor having about the following composition:

| | Grams per liter |
|---|---|
| KOH | 135 |
| $K_2MnO_4$ | 25 |
| $KMnO_4$ | 25 |

6 g.p.m. of mother liquor are continuously recycled from the crystallizer to the first tank 1, and 36 g.p.m. of mother liquor are continuously recycled to the second tank 4. 8 g.p.m. of mother liquor are conducted from the crystallizer to the evaporators. 125 grams of $K_2MnO_4$ per liter of the leach solution is oxidized to 99 grams of $KMnO_4$, which is recovered from the centrifuge 14 (11.5 lbs. produced/min.).

The potassium permanganate crystals in the centrifuge 14 are washed with water, and the wash is reused in making up the solution in the leach tank 1. The crystals are dried by hot air at 120° C. The potassium permanganate thus produced has a purity of 99.4%. The yield of potassium permanganate on the basis of the potassium manganate consumed is about 99% in the cell 7. The overall yield of potassium permanganate based upon the fresh potassium manganate supplied to the process is about 98%.

The cell operates at an overall electrolytic efficiency of 82% (potassium permanganate produced compared to the current required). The power requirement is low, being 0.25 D.C. kilowatt per pound of salable potassium permanganate produced.

The invention thus provides new and improved electrolytic cell apparatus which is especially well adapted for continuous or semi-continuous electrolysis therein. Electrolytic and conversion efficiencies are high, and high quality product may be produced in high yields in the apparatus. The construction is safe, compact and greatly simplified, so that it is easily operated with few personnel. Capital investment, maintenance, and operating costs are considerably reduced.

The invention is hereby claimed as follows:

1. An electrode for a dipolar electrolytic cell which comprises a conductive metal sheet forming an anode, conductive metal elements electrically connected to said sheet and projecting outwardly from spaced points distributed over a surface thereof, said elements being partly severed from said sheet and integral therewith, and polystyrene filling the spaces between said elements with the outer extremities of the elements exposed and being flush with said extremities, said exposed extremities forming a cathode.

2. An electrolytic cell which comprises a plurality of adjacent dipolar electrolytic cells adapted for applying a voltage thereto in series and for flow of an electrolyte therethrough in series, said dipolar cells having electrodes which comprise a conductive metal sheet electrically connected to conductive wire screen over one surface of the sheet and the combination forming an anode, conductive metal elements electrically connected to said sheet and projecting outwardly from spaced points distributed over the opposite surface, insulating material filling the spaces between said elements with the outer extremities of the elements exposed, and being flush with said extremities, said exposed extremities forming a cathode, and dividers of insulating material arranged between said electrodes to provide a tortuous cocurrent liquid-gas flow path between the anode and cathode of adjacent electrodes.

3. An electrolytic cell which comprises a plurality of adjacent dipolar electrolytic cells adapted for applying a voltage thereto in series and for flow of an electrolyte therethrough in series, said dipolar cells being formed by a plurality of substantially parallel electrodes presenting oppositely disposed anode and cathode surfaces in each of said cells; means to position said parallel electrodes and the cells formed thereby at an angle to the horizontal; said electrodes containing an opening adjacent the upper edge of the electrode with reference to the horizontal, thereby providing flow of electrolyte from one cell to the next; and dividers of insulating material arranged between each of said parallel electrodes to provide a tortuous cocurrent liquid-gas flow path between the anode and cathode of adjacent electrodes from the opening of one electrode into a cell downwardly to an area adjacent the lower edge of said cell and then upwardly through said cell to the opening of the next succeeding electrode.

4. An electrolytic cell which comprises: a plurality of adjacent dipolar electrolytic cells adapted for applying a voltage thereto in series and for flow of an electrolyte therethrough in series, said dipolar cells being formed by a plurality of substantially parallel electrodes intermediate the first and last cells in series, each of said electrodes comprising a conductive metal sheet electrically connected to conductive wire screen over one surface of the sheet and the combination forming an anode of one cell, and each of said electrodes further comprising conductive metal elements projecting outwardly from the opposite surface of said metal sheet at spaced points distributed thereover, said elements being electrically connected to said sheet, and insulating material filling the spaces between said elements with the outer extremities of the elements exposed, said exposed extremities forming a cathode of the cell adjacent to the cell corresponding to the anode of the same electrode; means to position said parallel electrodes and the cells formed thereby at an angle to the horizontal; each of said electrodes containing an opening adjacent the upper edge of the electrode with reference to the horizontal, thereby providing flow of electrolyte from one cell to the next; and dividers of insulating material arranged between each of said parallel electrodes to provide a tortuous cocurrent liquid-gas flow path between the anode and cathode of adjacent electrodes from the opening of one electrode into a cell downwardly to an area adjacent the lower edge of said cell and then upwardly through said cell to the opening of the next succeeding electrode.

5. An electrode for a dipolar electrolytic cell which comprises a conductive metal sheet forming an anode, conductive metal elements electrically connected to said sheet and projecting outwardly from spaced points distributed over a surface thereof, said elements being partly severed from said sheet and integral therewith, a synthetic organic resin insulating material filling the spaces between said elements with the outer extremities of the elements exposed, and being flush with said extremities, said exposed extremities forming a cathode.

6. An electrolytic cell which comprises: a plurality of adjacent dipolar electrolytic cells adapted for applying a voltage thereto in series and for flow of an electrolyte therethrough in series, said dipolar cells being formed by a plurality of substantially parallel electrodes intermediate the first and last cells in series, each of said electrodes comprising a conductive metal sheet electrically connected to conductive wire screen over one surface of the sheet and the combination forming an anode of one cell, and each of said electrodes further comprising conductive metal elements projecting outwardly from the opposite surface of said metal sheet at spaced points distributed thereover, said elements being electrically connected to said sheet, and a polystyrene insulating material filling the spaces between said elements with the outer extremities of the elements exposed, said exposed extremities forming a cathode of the cell adjacent to the cell corresponding to the anode of the same electrode; means to position said parallel electrodes and the cells formed thereby at an angle to the horizontal; each of said electrodes containing an opening adjacent the upper edge of the electrode with reference to the horizontal, thereby providing flow of electrolyte from one cell to the next; and dividers of insulating material arranged between each of said parallel electrodes to provide a tortuous cocurrent liquid-gas flow path between the anode and cathode of adjacent electrodes from the opening of one electrode into a cell downwardly to an area adjacent the lower edge of said cell and then upwardly through said cell to the opening of the next succeeding electrode.

References Cited in the file of this patent

UNITED STATES PATENTS

| | | |
|---|---|---|
| 1,152,772 | Wheeler | Sept. 7, 1915 |
| 1,313,246 | Antisell | Aug. 19, 1919 |
| 1,365,875 | Ward | Jan. 18, 1921 |
| 2,843,537 | Carus | July 15, 1958 |
| 2,848,402 | Van Dorsser | Aug. 19, 1958 |
| 2,908,620 | Carus | Oct. 13, 1959 |

FOREIGN PATENTS

| | | |
|---|---|---|
| 5,909 | Sweden | May 10, 1894 |
| 9,285 | Great Britain | May 10, 1894 |
| 434,165 | Great Britain | Aug. 26, 1935 |
| 719,838 | Great Britain | Dec. 8, 1954 |

UNITED STATES PATENT OFFICE
CERTIFICATE OF CORRECTION

Patent No. 3,062,734                      November 6, 1962

Milton B. Carus

It is hereby certified that error appears in the above numbered patent requiring correction and that the said Letters Patent should read as corrected below.

Column 5, line 21, for "consisted" read -- constituted --; lines 68 and 69, strike out "The, the polystyrene is milled off and seal the spaces."; column 7, line 34, strike out "of", second occurrence.

Signed and sealed this 24th day of September 1963.

(SEAL)
Attest:

ERNEST W. SWIDER
Attesting Officer

DAVID L. LADD
Commissioner of Patents